(12) United States Patent
Dubois et al.

(10) Patent No.: US 6,502,457 B1
(45) Date of Patent: Jan. 7, 2003

(54) COUNTERMEASURE HOVERING TEST FIXTURE

(75) Inventors: Neil J. Dubois, Cranston, RI (US); William S. Wilkinson, North Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/506,934

(22) Filed: Feb. 18, 2000

(51) Int. Cl.$^7$ ................................................ G01M 9/00
(52) U.S. Cl. ........................................ 73/167; 73/865.9
(58) Field of Search .............................. 73/865.9, 147, 73/148, 117.4, 117.3

(56) References Cited

U.S. PATENT DOCUMENTS

| | | | |
|---|---|---|---|
| 1,682,138 A | * | 8/1928 | Merrill ......................... 73/147 |
| 1,947,962 A | * | 2/1934 | Alfaro ......................... 73/147 |
| 3,070,998 A | * | 1/1963 | Schreiber ..................... 73/147 |
| 4,116,056 A | * | 9/1978 | Bulychev et al. ............. 73/147 |

* cited by examiner

*Primary Examiner*—Helen Kwok
(74) *Attorney, Agent, or Firm*—Michael J. McGowan; James M. Kasischke; Michael F. Oglo

(57) ABSTRACT

A test fixture for testing hovering performance of a tailcone of a countermeasure device is disclosed. The tailcone includes a motor and a propeller which is driven by the motor. The test fixture includes an upper support device, a lower support device, at least one cable connected between the upper and lower support devices and a connection device which slidably attaches the tailcone to the at least one cable, thereby restricting movement of the tailcone along the at least one cable. The upper support device is supported above a water-filled tank, the lower support is disposed in the water-filled tank and the hovering capability of the tailcone is tested by operating the tailcone in the tank. The connection device includes a number of extensions affixed to the tailcone. The extensions each include a clasp spaced from the tailcone. The clasps, are slidably joined along the cables, thereby attaching the tailcone to the cables. The fixture further includes a winch attached to the upper support device, wherein one of the cables is wound onto the winch. The winch retracts the attached cable, thereby pulling the lower support device from the tank.

9 Claims, 4 Drawing Sheets

COUNTERMEASURE HOVERING TEST FIXTURE

STATEMENT OF GOVERNMENT INTEREST

The invention described herein may be manufactured and used by or for the Government of the United States for governmental purposes without the payment of any royalties thereon or therefor.

BACKGROUND OF THE INVENTION (1) Field of the Invention

This invention relates generally to an apparatus for facilitating measurement of the hovering ability of a countermeasure device, and more particularly to an apparatus for retaining a countermeasure device in a vertical guide path to enable testing of the hovering and depth control capabilities of the countermeasure device.

(2) Description of the Prior Art

The use of acoustic countermeasure devices in undersea warfare is common throughout the world. Some of these devices are required to hover in place, and therefore utilize a propeller and motor system to enable the countermeasure device to hover. During the design of these countermeasure devices, the hovering ability must be tested in order to determine the performance of the system. When testing the hovering capabilities of the countermeasure device, it is important that the countermeasure device only be allowed to travel in a vertical plane in order to eliminate any horizontal movement which may interfere with the testing of the countermeasure device.

Furthermore, conventional testing of the hovering capabilities of countermeasure devices requires that the testing be done in large water tanks which can accommodate the size of the entire countermeasure device.

What is needed therefore, is an apparatus for testing the hovering ability of countermeasure devices, which provides a vertical guide path for the countermeasure device for restricting travel of the countermeasure device in a vertical plane. Such an apparatus would enable convenient and accurate testing of hovering countermeasure devices and would reduce the size of the tank in which the tests are conducted.

SUMMARY OF THE INVENTION

Accordingly, it is an object of the present invention to provide an apparatus which is capable of restricting the travel of a hovering countermeasure device in a vertical path to enable the hovering ability of the countermeasure device to be tested.

It is a further object of the invention to reduce the volume of water necessary for performing hovering tests of countermeasure devices.

The present invention is directed to a test fixture for testing hovering performance of a countermeasure device tailcone. The tailcone includes a motor and a propeller which is driven by the motor. The test fixture has an upper support device, a lower support device, at least one cable connected between the upper and lower support devices and a connection device which slidably attaches the tailcone to at least one cable. The fixture thereby restricts movement of the tailcone along the at least one cable. The upper support device is supported above a water-filled tank, the lower support is disposed in the water-filled tank and the hovering capability of the tailcone is tested by operating the tailcone in the tank. The connection device includes a number of extensions affixed to the tailcone. The number of extensions each include a clasp spaced from the tailcone, wherein the cables are threaded through the clasps, thereby attaching the tailcone to the cables. The fixture further includes a winch attached to the upper support device, wherein one of the cables is wound onto the winch, the winch being operative for taking up the cable attached thereto, thereby pulling the lower support device from the tank.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
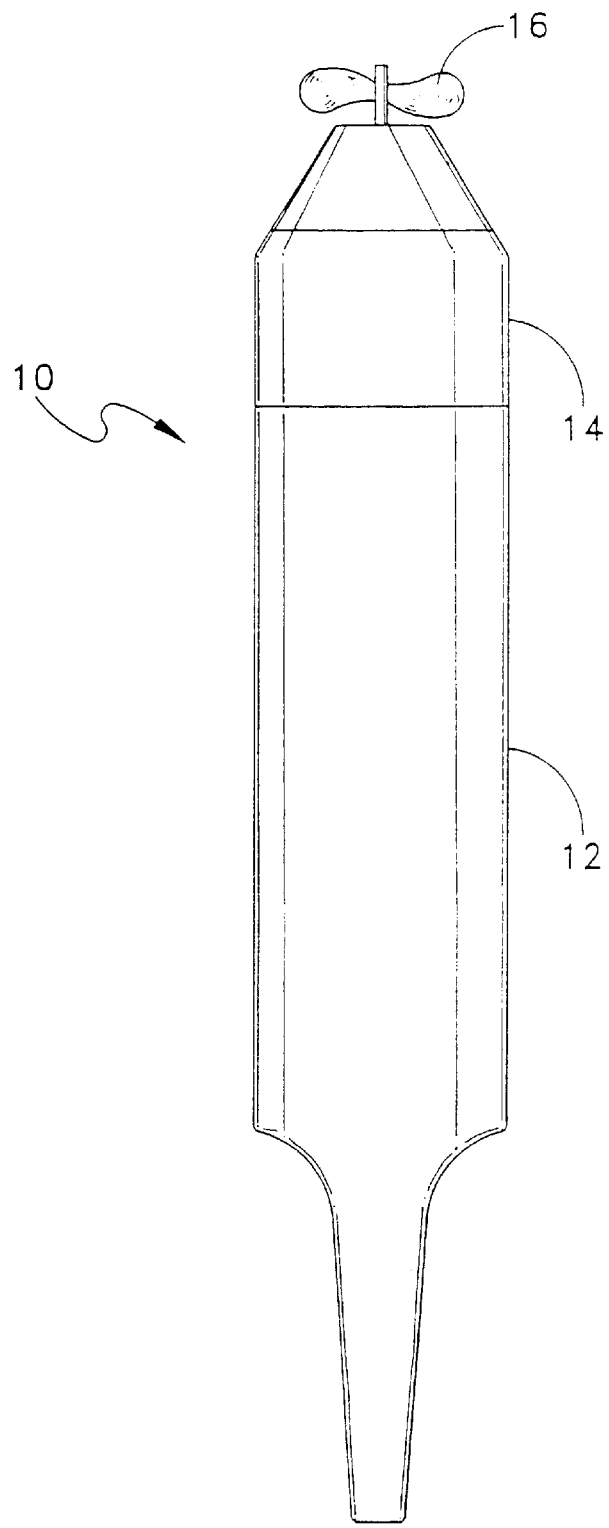
FIG. 1 is a plan view of a conventional countermeasure device.

Referring now to the drawing figures, there is shown in FIG. 1, a conventional countermeasure device, generally indicated at 10. The countermeasure device 10 includes a body portion 12 for housing acoustic equipment, a tailcone shell 14 which houses the motor and controls (not shown) for the hovering system and an outboard propeller 16 which is driven by the motor and provides thrust to the countermeasure device 10.

Figure 2:
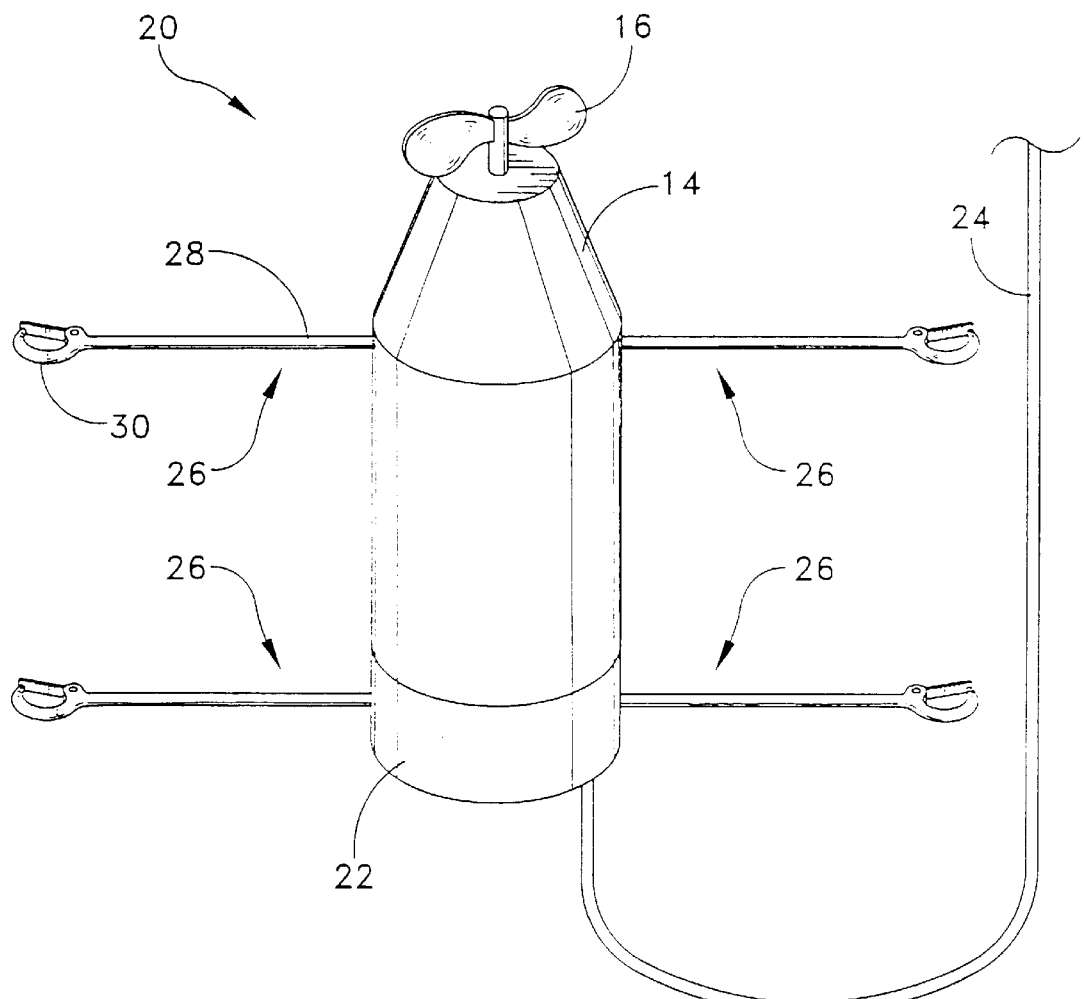
FIG. 2 is a perspective view of the test hardware used in conjunction with the present invention.

FIG. 2 is a perspective view of the test tailcone and the test hardware, generally indicated at 20. The test tailcone 20 includes the tailcone shell 14 and a test bulkhead 22. Test bulkhead 22 is attached to the tailcone shell 14 in order to seal the tailcone shell 14 to prevent water from entering the tailcone shell 14 during the testing procedure. Test bulkhead 22 also houses a connection apparatus which enables power and depth command signals to be transmitted to the tailcone shell 14 via a sealed hose connection 24 (See FIG. 3). The test tailcone 20 also includes four guide rods 26, each of which includes an extension 28 and an eyelet clasp 30, the purpose of which is described with reference to FIG. 3, below. The guide rods 26 are attached to the test tailcone 14 in a conventional manner, such as by bolting or welding.

Figure 3:
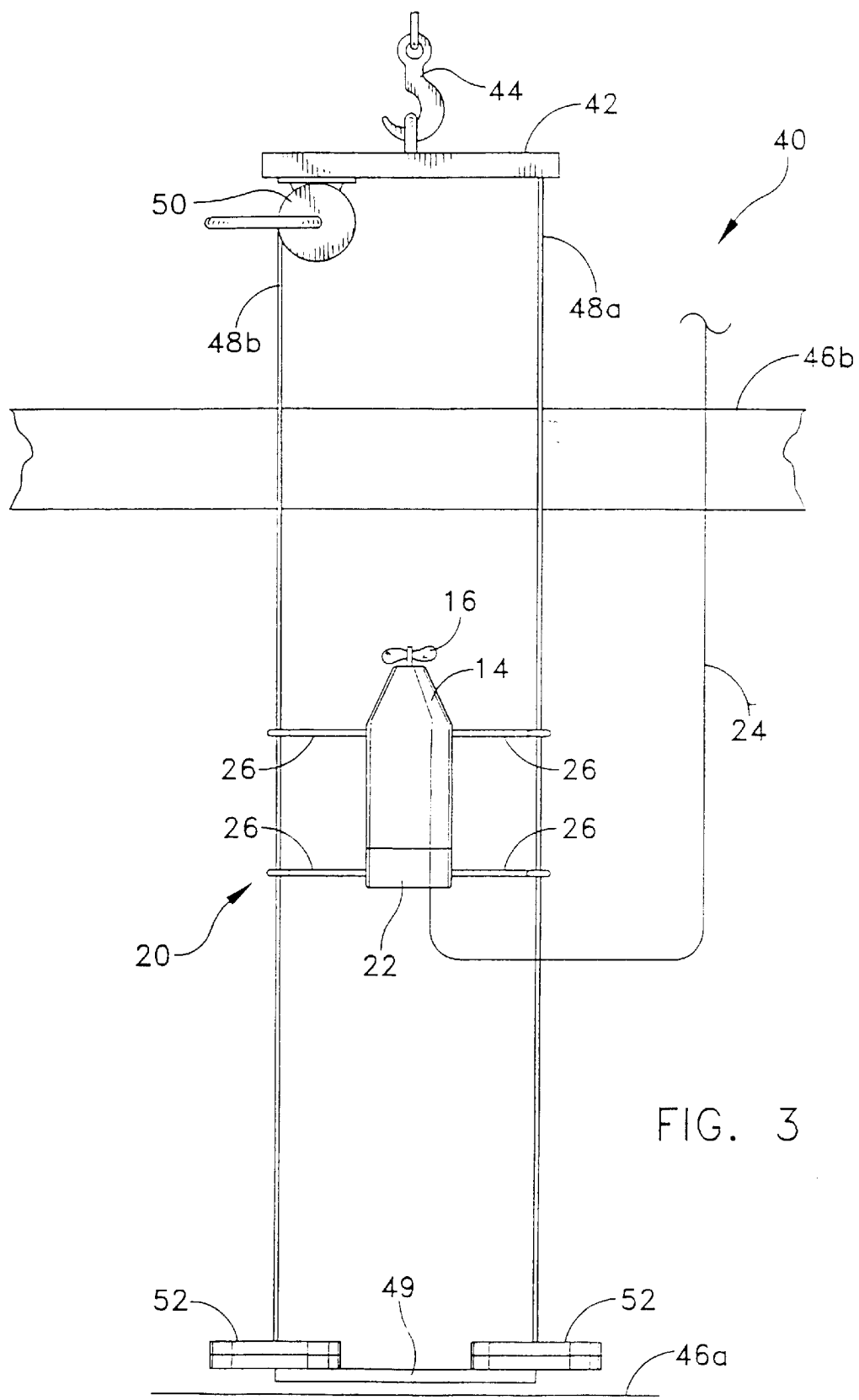
FIG. 3 is a plan view of the countermeasure hovering test apparatus of the present invention.

Referring now to FIG. 3, the test guide structure, generally indicated at 40, will now be described. The test guide structure 40 includes a top plate 42 which is supported by a crane hook 44, which enables the test guide structure 40 to be lowered into position above a water-filled testing tank which includes a floor, partially shown at 46a, and a top rim, partially shown at 46b. A first cable 48a is attached at one end to the top plate 42 in a conventional manner and is attached at the other end to a weight plate 49. A second cable 48b is wound onto a winch 50 at the one end thereof, and attached to the weight plate 49 at the other end thereof. The winch 50 is attached to the top plate 42 in a conventional manner. The cables 48a and 48b are connected between top plate 42 and weight plate 49 such that when the test guide structure 40 is deployed, as shown in FIG. 3, the cables 48*a* and 48*b* are parallel to each other. A set of weights 52 can be mounted on the weight plate 49. Cables 48*a* and 48*b* can be joined to weight plate 49. These weights 52 operate to allow tension to be applied to cables 48*a* and 48*b* between the top plate 42 and the weight plate 49 to tighten the cables 48*a* and 48*b*, thereby providing more stable operation.

The operation of the countermeasure device hovering test fixture of the present invention will now be described with reference to FIG. 3. In order to set up the test guide structure 40, the structure is lowered into position above the top rim 46*b* of the tank by the crane hook 44 and a crane (not shown). At this point, the cable 48*b* is wound onto the winch 50, causing the weight plate 49 to hang vertically from the cable 48*b*. Once the top plate 42 is in position above the tank, the cable 48*b* is unwound from the winch 50, thereby lowering the weight plate 49 into the tank until it rests on the floor 46*a* of the tank. Once the weight plate 49 is positioned on the floor 46*a* of the tank such that cables 48*a* and 48*b* are parallel with each other, the test tailcone 20 is attached to the cables by attaching the eyelet clasps 30 on each side of the test tailcone 20 to the corresponding cable 48*a* and 48*b*, as shown in FIG. 3.

In this configuration, the test tailcone 20 is restricted to moving only vertically along the guide path defined by the cables 48*a* and 48*b*. With power and depth command signals being provided to the test tailcone 20 via the sealed hose connection 24, the hovering capabilities of the test tailcone 20 can be ascertained. Since no horizontal movement of the test tailcone 20 is possible, more accurate determinations of the hovering ability of the test tailcone 20 can be made.

In addition to providing a guide path for testing the test tailcone 20, the weight plate 49 provides a mechanical stop for the test tailcone should it fail to operate and also facilitates the retrieval of the test tailcone 20 simply by reeling in the cable 48*b* with the winch 50 to pull the weight plate 49 and the test tailcone 20 from the tank. While the weight plate 49 is shown and described as being fixed to the cables 48*a* and 48*b*, it will be understood that the weight plate 49 can be configured with a pulley system which enables the weight plate 49 to be lowered into the tank in a horizontal orientation.

Figure 4:
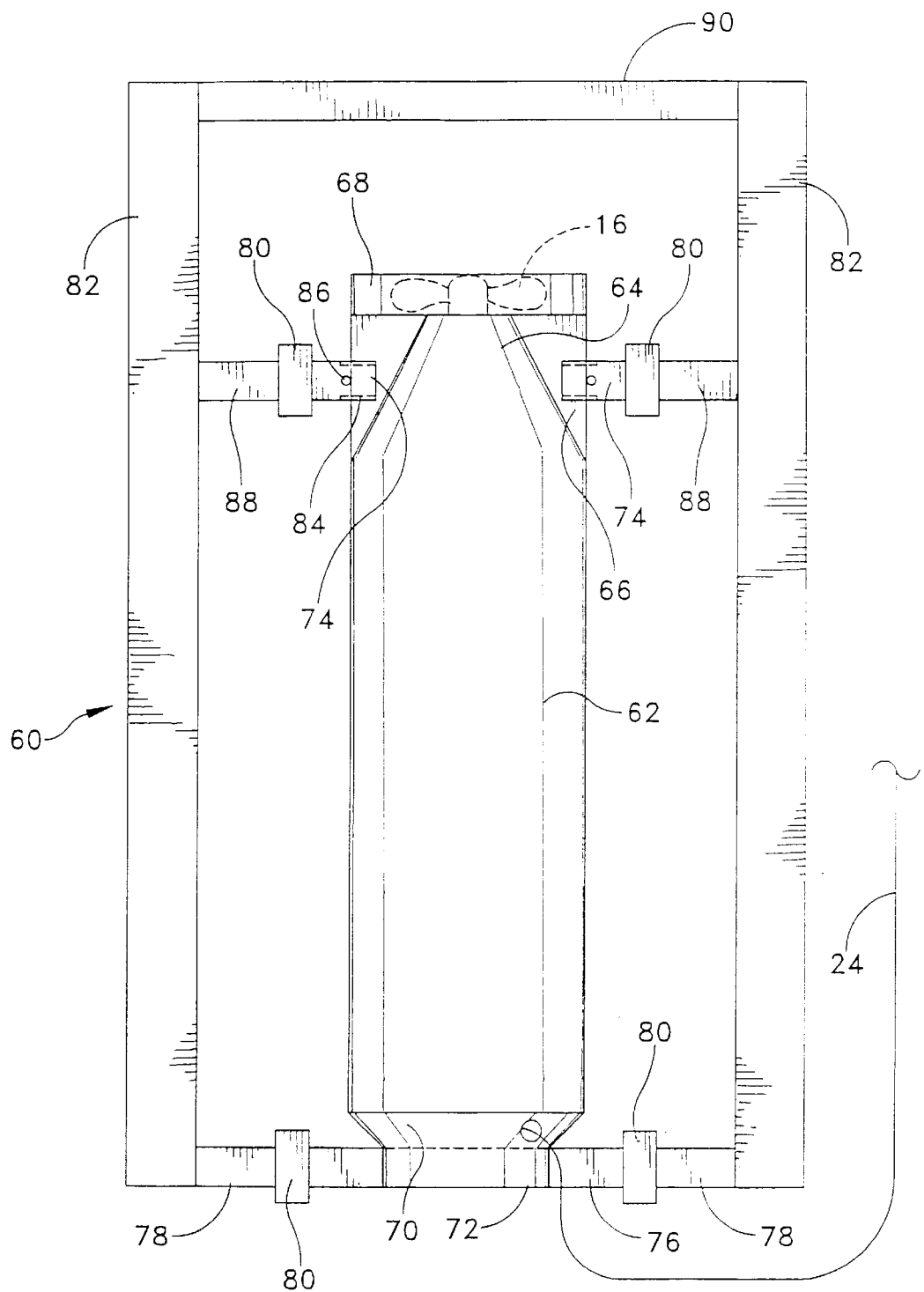
FIG. 4 is a plan view of an alternate embodiment of the test hardware used in conjunction with the present invention.

In FIG. 4, there is shown an alternative embodiment of the test hardware used in conjunction with the present invention. The alternative test hardware is generally indicated as 60 which can be used as a replacement for hardware 20 shown in FIGS. 2 and 3. In this alternative, a countermeasure 62 has a tailcone 64 with fins 66 disposed thereon. A propeller 16 is positioned on the tailcone 64 within a cowl 68. A test bulkhead 70 is positioned on the countermeasure 62 at the other end. Test bulkhead 70 has a clamp 72 positioned thereon. As in the other embodiment, cable 24 extends from the countermeasure to provide power and control instructions.

Countermeasure 62 is held within hardware 60 by clamp 72 and slotted fixtures 74. Clamp 72 surrounds an intermediate base pipe 76 and joins bulkhead 70 thereto. Intermediate base pipe 76 is joined to base pipes 78 by unions 80 threaded on either end of the intermediate base pipe 76. Base pipes 78 are joined to the base ends of sliding pipes 82.

Slotted fixtures 74 are rigid tubes each having a slot 84 formed longitudinally at the end thereof. A tightening bolt 86 is positioned through an aperture formed in the slotted part of each slotted fixture 74 for allowing the slot 84 to be tightened or loosened. Slots 84 are sized to retain countermeasure fins 66. Slotted fixtures 74 are joined to middle support pipes 88 by unions 80 threaded between fixtures 74 and pipes 88. Middle support pipes 88 are joined to the middle of sliding pipes 82.

Sliding pipes 82 are further maintained in parallel relation to one another by an upper pipe 90 joined to the upper ends of sliding pipes 82. Sliding pipes 82 are sized to slide along cables 48*a* and 48*b* while maintaining the countermeasure 62 in a vertical position. This embodiment allows countermeasure 62 to be easily removed from test fixture 62 by detaching unions 80.

Based on the foregoing, it can be seen that the present invention provides an apparatus which facilitates the testing of the hovering ability of a countermeasure device. By only requiring that the tailcone portion of the countermeasure device be tested, which portion is solely responsible for providing the hovering capabilities of the countermeasure device, the testing can be performed in a smaller volume of water with less instrumentation and reduced power requirements.

While there is shown and described herein certain specific structure embodying the invention, it will be manifest to those skilled in the art that various modifications and rearrangements of the parts may be made without departing from the spirit and scope of the underlying inventive concept. Accordingly, the invention is not limited to the particular forms herein shown and described except insofar as indicated by the scope of the appended claims.

What is claimed is:

1. A test fixture for testing hovering performance of a countermeasure device tailcone, the tailcone including a motor and a propeller which is driven by the motor, the test fixture comprising:

a water-filled tank;

an upper support device supported above said water-filled tank;

a lower support device disposed in said water-filled tank;

at least one cable connected between said upper and lower support devices; and a connection device attaching the tailcone slidably to said at least one cable, thereby permitting movement of the tailcone only along said at least one cable wherein said at least one cable comprises a pair of cables connected between said upper and lower support devices in a parallel relationship, and said connection device attaches the tailcone slidably between the pair of cables.

2. The test fixture of claim 1 wherein said connection device comprises:

a number of extensions affixed to the tailcone; and a clasp joined to each extension and spaced from the tailcone, wherein said pair of cables are slidably captured by said clasps.

3. The test fixture of claim 2 further comprising a number of weights disposed on said lower support device for imparting tension to said cables.

4. The test fixture of claim 3 further comprising a winch attached between said upper support device and one of said at least one cable, said cable being wound onto said winch, and said winch being operative for taking up said cable and pulling the lower support device from the tank.

5. The test fixture of claim 1 further comprising a power communication hose joined to said tailcone for supplying power and commands to said tailcone.

6. A test fixture for testing the hovering performance of a powered device comprising:

a tank;

a crane mounted above said tank;

an upper support device joined to said crane, said crane acting to raise and lower said upper support device;

at least one cable joined to said upper support device;

a lower support device joined to a distal end of said at least one cable for positioning in said tank; and at least one connection device slidably disposed on said at least one cable and joined to the powered device for allowing movement of said powered device along said at least one cable;

wherein:

said at least one cable comprises a pair of cables connected between said upper support device and said lower support device in a parallel relationship; and said at least one connection device comprises at least two connection devices with each connection device joined to said powered device and slidably disposed on one of said pair of cables.

7. The fixture of claim 6 further comprising a winch disposed on said upper support device and joined to one of said pair of cables for retracting said cable.

8. The fixture of claim 6 wherein each connection device comprises:

an extension rigidly fixed to said powered device; and a clasp rigidly joined to said extension and capable of joining slidably on one said cable.

9. The fixture of claim 6 further comprising a power communications cable joined to said powered device for providing commands and power to said powered device.

* * * * *